United States Patent
Koyama

Patent Number: 6,040,881
Date of Patent: Mar. 21, 2000

[54] PROJECTION TYPE DISPLAY APPARATUS WITH COLOR OPTIMIZED ANTI-REFLECTION FILMS

[76] Inventor: Osamu Koyama, c/o Canon Kabushiki Kaisha, 30-2, Shimomaruko 3-chome, Ohta-ku, Tokyo, Japan

[21] Appl. No.: 08/895,352

[22] Filed: Jul. 16, 1997

[30] Foreign Application Priority Data

Jul. 17, 1996 [JP] Japan ................... 8-187478

[51] Int. Cl.⁷ .................. G02F 1/1335; G02B 1/10
[52] U.S. Cl. .................. 349/8; 349/5; 349/9; 349/62; 349/137; 359/580; 359/581
[58] Field of Search .................. 349/137, 5, 8, 349/9, 62; 359/580, 581

[56] References Cited

U.S. PATENT DOCUMENTS

| | | | |
|---|---|---|---|
| 4,875,064 | 10/1989 | Umeda et al. | 353/78 |
| 4,943,154 | 7/1990 | Miyatake et al. | 353/31 |
| 4,975,328 | 12/1990 | Hirose et al. | 428/413 |
| 5,051,652 | 9/1991 | Isomura et al. | 313/479 |
| 5,103,327 | 4/1992 | Hirai et al. | 359/51 |
| 5,221,982 | 6/1993 | Faris | 349/8 |
| 5,245,479 | 9/1993 | Falanga | 359/838 |
| 5,320,913 | 6/1994 | Morimoto et al. | 428/688 |
| 5,577,826 | 11/1996 | Kasama et al. | 349/5 |
| 5,626,409 | 5/1997 | Nakayama et al. | 353/31 |
| 5,654,811 | 8/1997 | Spitzer et al. | 349/106 |

FOREIGN PATENT DOCUMENTS

| | | |
|---|---|---|
| 61-13885 | 6/1984 | Japan . |
| 4-65594 | 6/1985 | Japan . |
| 2505758 | 8/1986 | Japan . |
| 62-1391 | 1/1987 | Japan . |
| 6-265842 | 3/1993 | Japan . |

*Primary Examiner*—William L. Sikes
*Assistant Examiner*—Tarifur R. Chowdhury
*Attorney, Agent, or Firm*—Morgan & Finnegan, LLP

[57] ABSTRACT

In a reflection type liquid crystal projector, anti-reflection film optimized for the corresponding color (wavelength band) is formed on each of the light passing surfaces of a cross dichroic prism which are opposed to liquid crystal panels of respective colors and the reflectance of each anti-reflection film is made sufficiently small to thereby enhance the contrast of a colored image projected onto a screen by a projection lens.

30 Claims, 5 Drawing Sheets

-- PRIOR ART --

PROJECTION TYPE DISPLAY APPARATUS WITH COLOR OPTIMIZED ANTI-REFLECTION FILMS

BACKGROUND OF THE INVENTION

1. Field of the Invention

This invention relates to a projection type display apparatus such as a liquid crystal projector, and particularly to an anti-reflection coat for use in the color separating and combining optical system of a liquid crystal projector using a reflection type liquid crystal panel.

2. Related Background Art

In a liquid crystal projector using a reflection type liquid crystal display panel, anti-reflection film is necessary on a color separating and combining prism to improve the contrast of a color image.

White light from a lamp is separated into lights of three primary colors, i.e., red, green and blue (hereinafter referred to as R, G and B, respectively) by the color separating synthetic prism. Accordingly, it is conceived that anti-reflection film optimized for white light is formed, for example, on the end surface of the color separating and combining prism onto and from which the white light is incident and emerges or the end surface of the color separating and combining prism onto and from which light beams of three primary colors, R, G and B are incident and outgone.

FIG. 7 of the accompanying drawings shows the construction of such anti-reflection film, and FIG. 8 of the accompanying drawings shows the spectral characteristic of the anti-reflection film of FIG. 7.

The anti-reflection film shown in FIG. 7 is optimized for white light, and has high refractivity layers, intermediate refractivity layers and low refractivity layers alternately formed by the use of three materials. The construction of this film is specifically an improvement in a substrate-$\lambda/4$ (intermediate refractivity layer)-$\lambda/2$ (high refractivity layer)-$\lambda/4$ (low refractivity layer) air type anti-reflection film ($\lambda$ being the design wavelength), and the intermediate refractivity layer which is the first layer is constructed of equivalent film of the high refractivity layer and the intermediate refractivity layer, and the high refractivity layer which is the second layer is constructed of equivalent film of the high refractivity layer/the intermediate refractivity layer/the high refractivity layer.

However, the reflectivity of this anti-reflection film is of the order of 0.2% in the wavelength band of 400–700 nm, and even if this anti-reflection film is formed on the end surfaces of a color separating synthetic prism on and from which light beams of three primary colors, R, G and B, are incident and outgone, a quantity of unnecessary reflected light which cannot be neglected enters a screen and therefore, the contrast of a color image in a liquid crystal projector cannot be heightened.

Also, the liquid crystal projector according to the conventional art has suffered from the problems that because three materials are used, film deposition cannot be done if not in a special apparatus for thin film deposition, the control of the film thickness and refractive index of each layer is severe and the cost is high, and the film thickness becomes high and therefore the film deposition tact time becomes long and the cost becomes high.

SUMMARY OF THE INVENTION

Accordingly, it is a primary object of the present invention to provide a projection type display apparatus by which colored images of higher contrast than in the conventional art can be obtained.

It is a further object of the present invention to provide a projection type display apparatus having anti-reflection film which can be formed by an apparatus for thin film deposition simpler than in the conventional art and at a cost lower than in the conventional art.

To achieve the above primary object, the first projection type display apparatus of the present invention is a projection type display apparatus for projecting a plurality of images of different colors formed by a plurality of reflection type image forming elements to thereby form a colored image, characterized in that anti-reflection film (substantially or completely) optimized for the corresponding color is formed on the surface of a color separating and combining prism through which light of each color passes.

Also, the second projection type display apparatus of the present invention is a projection type display apparatus for superposing a plurality of images of different colors upon one another to thereby form a colored image, characterized in that it has at least one of a color separating prism, a color combining prism and a lens for each other, and in the case of said color separating prism or said color combining prism, anti-reflection film (substantially or completely) optimized for the corresponding color is formed on at least one (e.g., the passing surface for G light) of passing surfaces for the respective colors, and in the case of said lens for each color, anti-reflection film substantially optimized or optimized for the corresponding color is formed on the light passing surface of at least one lens (e.g., a lens for G).

The third projection type display apparatus of the present invention is a projection type display apparatus for projecting plurality of images of primary colors formed by a plurality of image forming elements to thereby form a colored image, comprising: a light source, separating means for separating light from the light source into the primary colors of light, directing means for directing the primary colors of light to the image forming elements, combining means for combining the plurality of images of primary colors, characterized in that anti-reflection film substantially optimized or optimized for corresponding primary color is formed on the surfaces of optical elements disposed between the separating means and the image forming elements, and between the combining means and the image forming elements.

To achieve the above further object, in a preferred form of the present invention, anti-reflection film of a type having a layer of high refractive index, a layer of low refractive index and a layer of equivalent intermediate refractive index is constructed by the use of two kinds of materials comprising a combination of one of zirconium oxide and titanium oxide and one of magnesium fluoride and silicon oxide.

DESCRIPTION OF THE PREFERRED EMBODIMENTS

Figure 1:
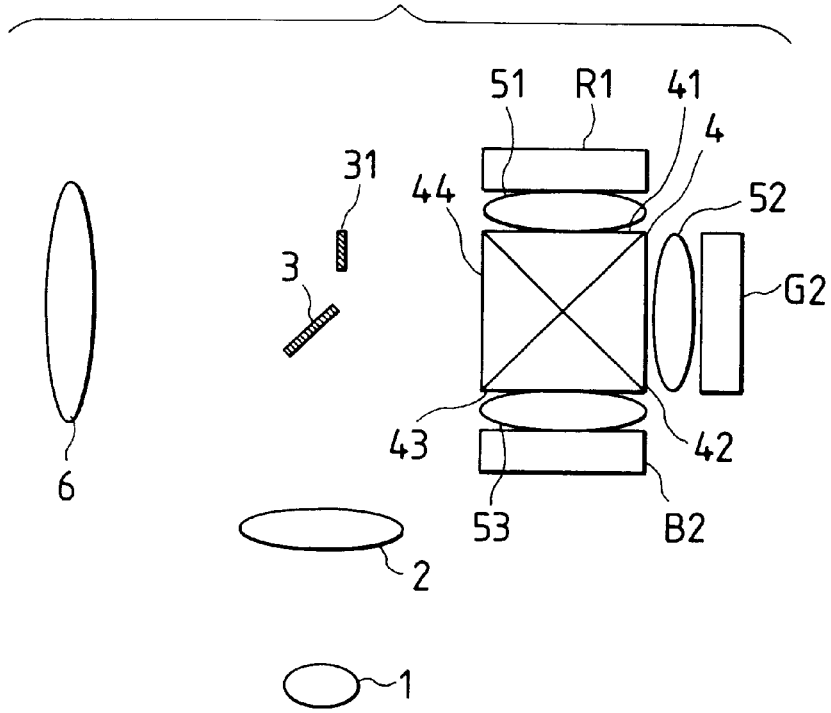
FIG. 1 is a schematic view showing an embodiment of the projection type display apparatus of the present invention.

FIG. 1 is a schematic view showing a liquid crystal projector which is an embodiment of the present invention. In FIG. 1, the reference numeral 1 designates a metal halide lamp, the reference numeral 2 denotes a condensing lens, the reference numeral 3 designates a compact mirror, the reference numeral 31 denotes a light intercepting plate, the reference numeral 4 designates a known cross dichroic prism, the reference numerals 41, 42, 43 and 44 denote anti-reflection film formed on the respective light passing surfaces of the prism 4, the reference numerals 51, 52 and 53 designate field lenses among the prism 4 and respective liquid crystal panels, the reference characters R1, G1 and B1 denote reflection type liquid crystal display panels for forming images of R, G and B colors, and the reference numeral 6 designates a projection lens for enlarging and projecting images of respective colors.

The anti-reflection film 41, 42 and 43 formed on the end surfaces (the light passing surfaces) of the prism 4 are substantially or completely optimized for the corresponding color (central wavelength). The lens 2 condenses the white light from the lamp 1 at a location of the reflecting mirror 3 and forms the image of the lamp at that location. The reflecting mirror 3 reflects the light from the image of the lamp and causes it to enter the cross dichroic prism 4. The prism 4 separates the incident light into light beams of three primary colors R, G and B, and upwardly reflects the R light beam, downwardly reflects the B light beam and causes the G light beam to rectilinearly travel to the right side. The field lenses 51, 52 and 53 convert the R, G and B light beams from the prism 4 into parallel lights and direct them to the corresponding reflection type liquid crystal display panels R1, G1 and B1.

The liquid crystal display panels R1, G1 and B1 are panels using scattering type liquid crystal, and when they reflect the light for each pixel, they scatter or do not scatter the light in conformity with a video signal to thereby form images of the corresponding colors. As the scattering type liquid crystal, the conventional DSM (dynamic scattering mode) type liquid crystal or the conventional TN (twist nematic) type liquid crystal enclosed in a resin capsule is available.

The R, G and B reflected lights from the liquid crystal display panels R1, G1 and B1 are condensed by the corresponding field lenses 51, 52 and 53, are combined together by the prism 4 and emerge from the prism 4 toward the projection lens 6 side. Here, the regularly reflected light of the R, G and B reflected lights which has not been scattered by the liquid crystal display panels R1, G1 and B1 is condensed at or in the vicinity of an aperture in a light intercepting mask constructed of the reflecting mirror 3 and the light intercepting plate 31 and therefore passes through this aperture and enters the projection lens 6, but most of the scattered light of the R, G and B reflected lights which has been scattered by the liquid crystal display panels R1, G1 and B1 is condensed in a place off the aperture in this light intercepting mask and therefore is intercepted by the reflecting mirror 3 and the light intercepting plate 31 and does not enter the projection lens 6. The projection lens 6 projects regularly reflected lights corresponding to images of the respective colors R, G and B onto a screen, not shown, and superposes the enlarged images of the respective colors upon one another there to thereby form a colored image.

Figure 2:
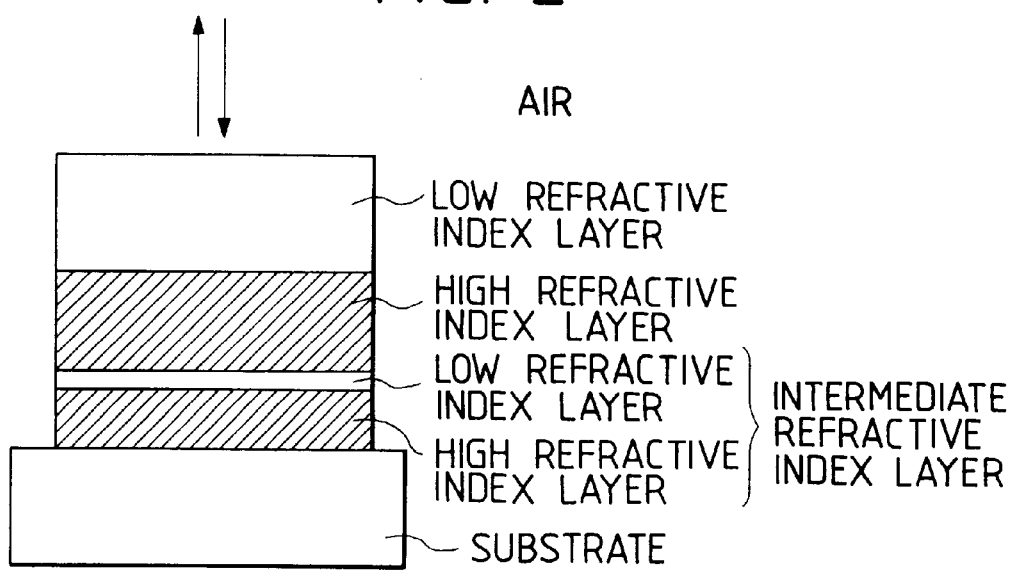
FIG. 2 is an illustration showing the construction of the anti-reflection film of FIG. 1.
Figure 3:
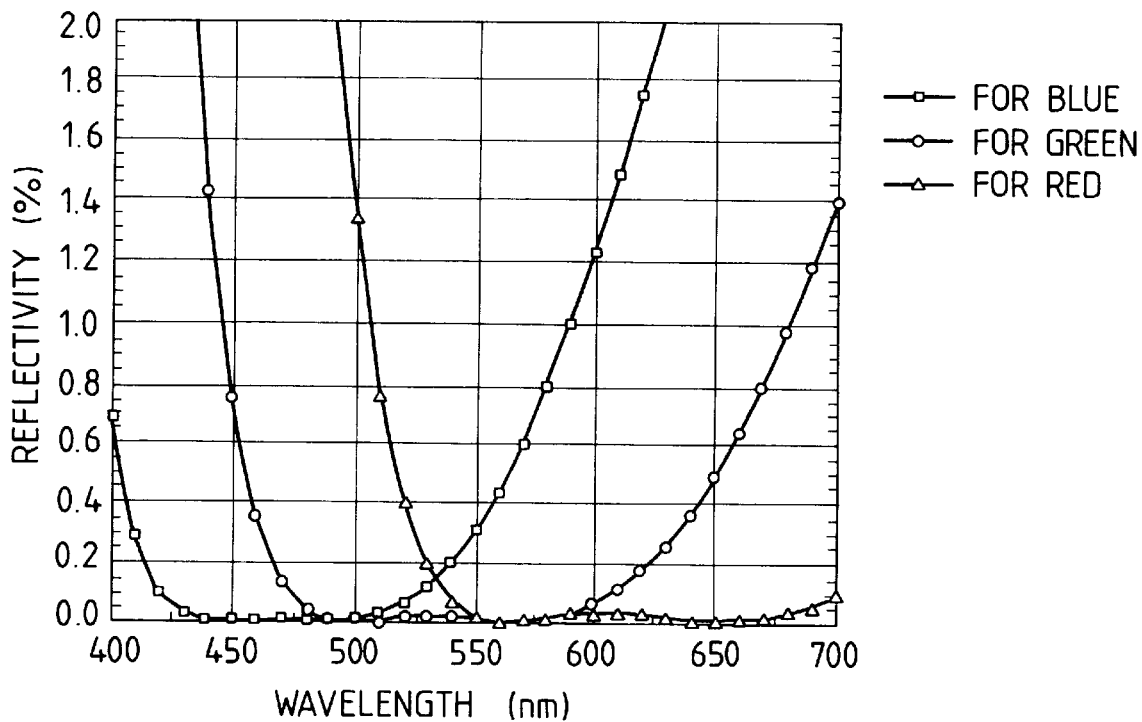
FIG. 3 is a graph showing the spectral reflection characteristic of the anti-reflection film of FIG. 1 for R, G and B light beams.
Figure 4:
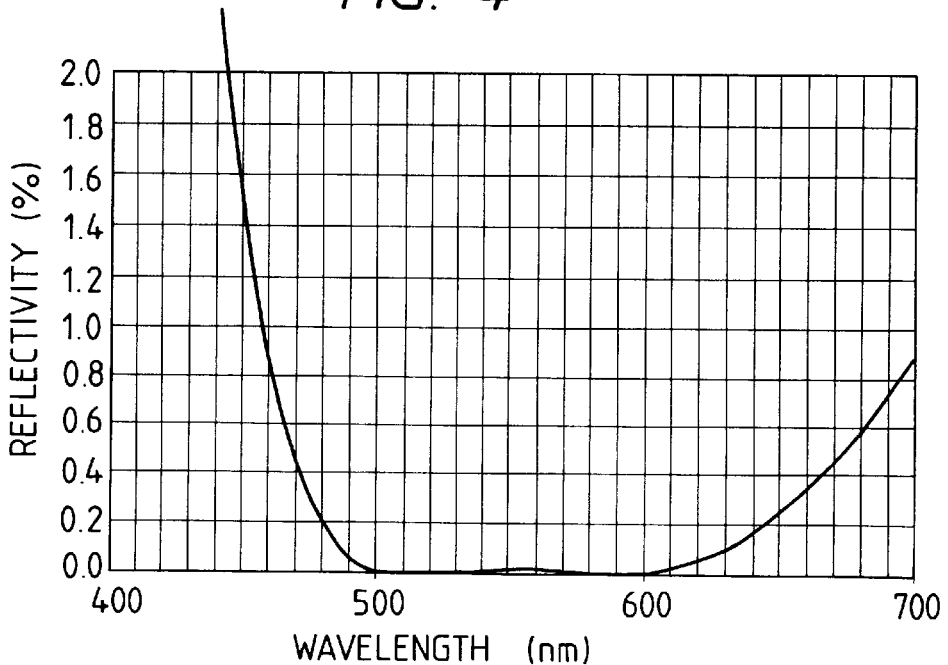
FIG. 4 is a graph showing the spectral reflection characteristic of the anti-reflection film for green.
Figure 6:
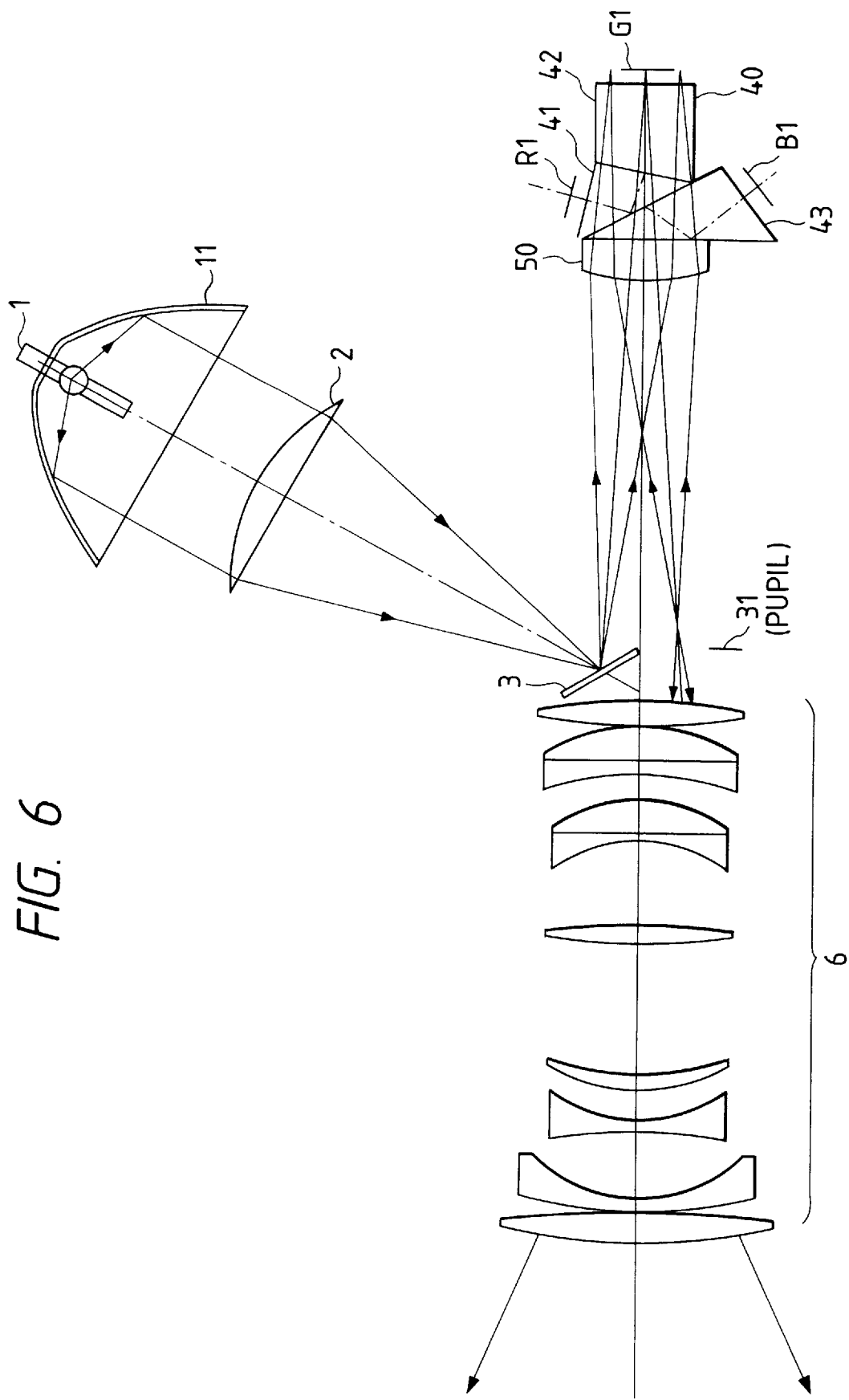
FIG. 6 is a schematic view showing another embodiment of the projection type display apparatus of the present invention.
Figure 7:
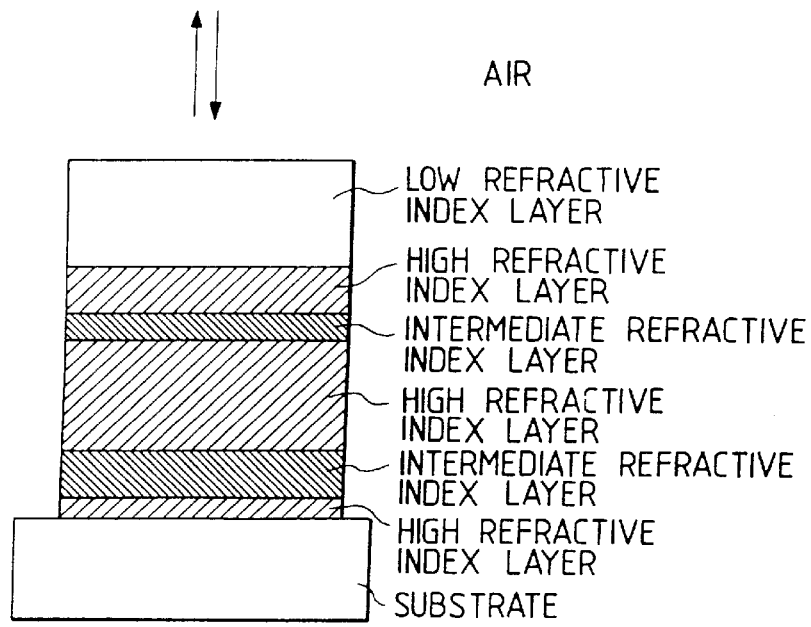
FIG. 7 is an illustration showing the construction of anti-reflection film used in the projection type display apparatus according to the conventional art.
Figure 8:
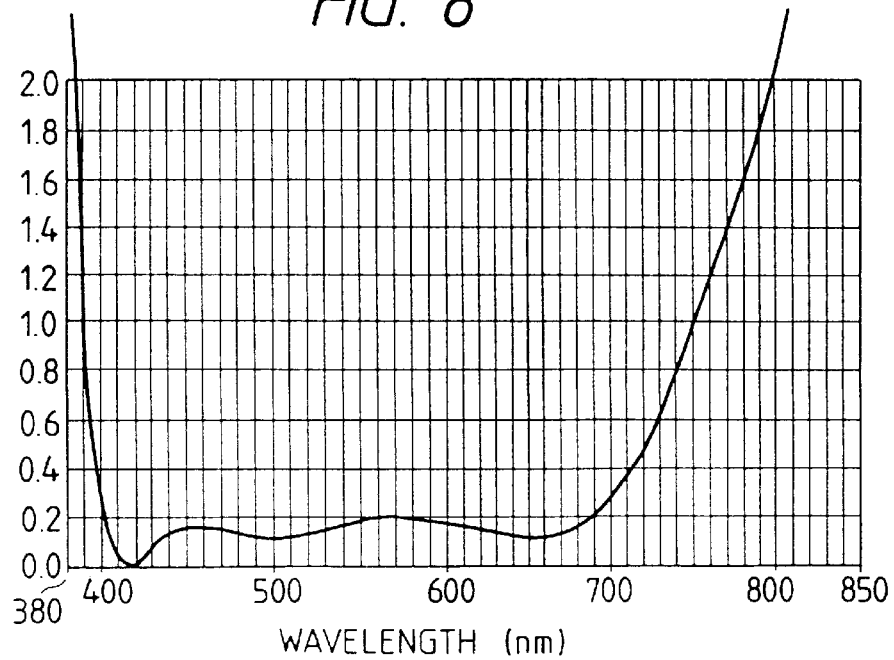
FIG. 8 is a graph showing the spectral reflection characteristic of the anti-reflection film of FIG. 7.

The film construction and spectral reflection characteristics of the anti-reflection film 41, 42, 43 formed on the respective end surfaces of the prism 4 are shown in FIGS. 2, 3 and 4. Also, the film 44 formed on the prism 4 is optimized for white light, and the film construction and spectral reflection characteristic thereof are as shown in FIGS. 6 and 7.

The anti-reflection film 41, 42, 43 is constructed by alternately forming two materials constituting a high refractivity layer and a low refractivity layer into film. The concrete film construction is as shown in FIG. 2, and anti-reflection film of the substrate-$\lambda/4$ (intermediate refractivity layer)-$\lambda/4$ (high refractivity layer)-$\lambda/4$ (low refractivity layer)-air type ($\lambda$ being the design central wavelength) is improved and the intermediate refractivity layer which is the first layer adjacent to the substrate is constructed of equivalent film comprising a high refractivity layer and a low refractivity layer. The high refractivity layer is a material of a refractive index of 1.9 or greater, and the low refractivity layer is a material of a refractive index of 1.5 or less, and a material such as zirconium oxide or titanium oxide of a refractive index of 2.1 is used for the high refractivity layer, and magnesium fluoride of a refractive index of 1.39 or silicon oxide of a refractive index of 1.45 is used for the low refractivity layer.

In the present embodiment, as shown in FIGS. 3 and 4, the reflectance of the anti-reflection film 42 for the G light beam of the design central wavelength 540 nm is 0.02% or less over the wavelength band of 500–610 nm, the reflectance of the anti-reflection film 43 for the B light beam of the design central wavelength 470 nm is 0.02% or less over the wavelength band of 430–510 nm, and the reflectance of the anti-reflection film 41 for the R light beam of the design central wavelength 610 nm is 0.02% or less over the wavelength band of 550–670 nm. If thus, the quantity of reflected lights occurring on the light passing surfaces which are the end surfaces of the cross dichroic prism 41 is smaller than in the conventional art, the intensity of flare light entering the screen, not shown, becomes smaller than in the conventional art and accordingly, the contrast of the colored image on the screen is improved.

Further, only two kinds of materials are required for the anti-reflection film in the present embodiment and therefore, when film is to be formed, the film can be formed by an inexpensive apparatus for thin film deposition, and the control items of the film thickness and refractive index of each layer decrease and the film deposition tact time becomes shorter and thus, the cost becomes low.

As modifications of the layer construction of the anti-reflection film in the present embodiment, there are a substrate-$\lambda/4$ (intermediate refractivity layer)-$\lambda/2$ (high refractivity layer)-$\lambda/4$ (low refractivity layer)-air type, a substrate-$\lambda/2$ (intermediate refractivity layer)-$\lambda/2$ (high refractivity layer)-$\lambda/4$ (low refractivity layer)-air type, a substrate-$3\lambda/4$ (intermediate refractivity layer)-$\lambda/2$ (high refractivity layer)-$\lambda/4$ (low refractivity layer)-air type, etc., and again in these film constructions, the intermediate refractivity layer which is the first layer can be replaced by the equivalent film of the high refractivity layer and the low refractivity layer and by a simple construction, a super-low reflectance can be achieved over the entire corresponding wavelength band.

In the present embodiment, by forming anti-reflection film of the same kind as that formed on the light passing surfaces 41, 42 and 43 of the prism 4 on the light passing surfaces of the field lenses 51, 52 and 53 as well, the contrast of the colored image on the screen can be further improved. Also, as a modification, there is a form in which the anti-reflection film is formed only on the field lenses 51, 52 and 53 and is not formed on the prism 4.

In the present embodiment, there can also be adopted a construction in which the field lenses 51, 52 and 53 are eliminated and a collimator lens is provided at the left (immediately forwardly) of the light passing surface 44 of the prism 4.

While in the above-described embodiment, anti-reflection film is formed on all light passing surfaces of the prism 4 and the field lenses, anti-reflection film may be formed on only the passing surface for the G light beam of the highest luminosity or only on one more surface in addition thereto.

Figure 5:
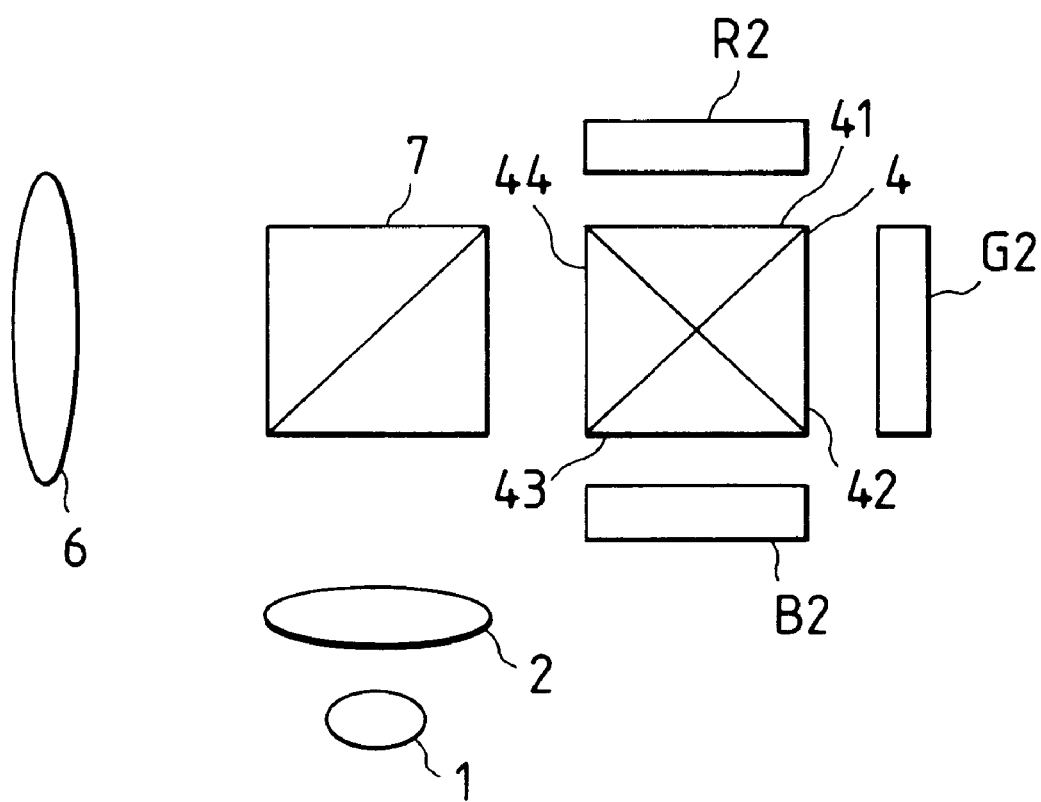
FIG. 5 is a schematic view showing another embodiment of the projection type display apparatus of the present invention.

FIG. 5 is a schematic view showing a liquid crystal projector which is another embodiment of the present invention. The same members as those in the embodiment of FIG. 1 are given the same reference numerals as those in FIG. 1 and need not be described.

In FIG. 5, the reference characters R2, G2 and B2 designate reflection type liquid crystal display panels using such TN liquid crystal as described in Japanese Patent Application Laid-Open No. 61-13885, and the reference numeral 7 denotes a polarizing beam splitter. The condensing lens 2 converts the light from the lamp 1 into parallel light, directs it to the beam splitter, reflects only the S-polarized component light of the (non-polarized) parallel light there, and causes this S-polarized component light to enter the prism 4. The prism 4 separates the incident light into light beams of three primary colors R, G and B, and upwardly reflects the R light beam, downwardly reflects the B light beam, and causes the G light beam to rectilinearly travel to the light, and directs the respective light beams to the corresponding reflection type liquid crystal display panels R2, G2 and B2.

The liquid crystal display panels R2, G2 and B2 rotate or do not rotate the polarized plane of the light in conformity with a video signal when they reflect the light for each pixel, thereby forming images of the corresponding colors. The R, G and B reflected lights from the liquid crystal display panels R2, G2 and B2 are combined together by the prism 4 and emerge from the prism 4 toward the polarizing beam splitter 7. Here, the P-polarized component light of the R, G and B reflected lights passes through the polarizing beam splitter 7 and enters the projection lens 6, while the S-polarized component light of the R, G and B reflected lights is reflected by the polarizing beam splitter 7 and does not enter the projection lens 6. The projection lens 6 projects P-polarized component lights corresponding to images of colors R, G and B onto the screen, not shown, and superposes enlarged images of respective colors upon one another there, thus forming a colored image.

The construction, operational effect and modification of the anti-reflection film 41, 42 and 43 in the present embodiment are the same as those in the embodiment of FIG. 1.

While in the above-described embodiments, the cross dichroic prism 4 is used as the optical system for color separating and combination, a combination of a plurality of cube prisms of the same shape as described in the above mentioned Japanese Patent Application Laid-Open No. 61-13885 or a "3P prism" comprising a combination of a plurality of prisms of different shapes as described in Japanese Patent No. 2505758 can be used in lieu of the prism 4.

A projection type display apparatus using this 3P prism will now be described with reference to FIG. 6. In FIG. 6, the light beam from the lamp 1 is reflected by a parabolic-surfaced reflector 11 and is made into a substantially parallel light beam, and is condensed on a mirror 3 disposed near the pupil 31 (stop) of the projection lens 6 by the condenser lens 2. The light beam reflected by the mirror 3 passes through a field lens 50, whereby it is made into a substantially parallel light beam and enters a 3P prism 40 which is a color separating and combining prism. The 3P prism 40 is such that B light beam reflecting dichroic film and R light beam reflecting dichroic film are disposed in succession from the light beam incidence side, and separates the white light from the lamp 1 into R, G and B light beams and directs the respective light beams to the corresponding liquid crystal display panels R1, G1 and B1.

The light beams reflected by the liquid crystal display panels R1, G1 and B1 and modulated by information written into each panel pass through the 3P prism in the opposite direction to the direction during the incidence thereof, and are combined into an image of full color. For example, liquid crystal consisting of the polymer dispersion type is enclosed in the liquid crystal display panels R1, G1 and B1, and when a white or bright level is to be displayed, it becomes transparent and transmit the light beams therethrough, and when a black or dark level is to be displayed, it scatters the light beams. The light beams reflected by the liquid crystal display panels R1, G1 and B1 and color-combined by the 3P prism 40 are condensed near the pupil 31 of the projection lens 6 by the field lens 50. Most of the light beams transmitted through the liquid crystal passes through the pupil 31 and displays the white or bright level on the screen, not shown, via the projection lens 6, while only a part of the light beams scattered by the liquid crystal passes through the pupil 31 and therefore displays the black or dark level on the screen.

The anti-reflection coat in the present embodiment is also applied to the end surfaces 41, 42 and 43 on and from which the R, G and B light beams separated in the 3P prism 40 are incident and outgone. The reflectance of the anti-reflection film provided on the end surface 42 is 0.02% or less in the wavelength band of 500–670 nm. Thereby, the unnecessary reflection from the optical system which has been the factor of reduced contrast in the reflection type liquid crystal projector has been greatly reduced.

Likewise, the reflectance of the anti-reflection film provided on the end surface 43 is 0.02% or less in the wavelength band of 430–510 nm. Also, the reflectance of the anti-reflection film provided on the end surface 41 is 0.02% or less in the wavelength band of 550–670 nm.

The construction, operational effect and modification of the anti-reflection film in the present embodiment are the same as those in the embodiment of FIG. 1.

Also, the above-described embodiments are ones using reflection type liquid crystal display panels, but there can also be adopted a form in which transmission type liquid crystal display panels are used. Again in this form, as in the form wherein reflection type liquid crystal display panels are used, the apparatus has at least one of a color separating prism, a color combining prism and a lens for each color, and in the case of the color separating prism or the color combining prism, anti-reflection film substantially optimized or optimized for the corresponding color is formed on at least one (e.g. the passing surface for the G light) of the passing surfaces for the respective colors, and in the case of the lens for each color, anti-reflection film substantially optimized or optimized for the corresponding color is formed on the light passing surface of at least one lens (e.g. the lens for G).

What is claimed is:

1. A projection type display apparatus for projecting a plurality of images of primary colors formed by a plurality of reflection type image forming elements to thereby form a colored image, characterized in that a plurality of anti-reflection films are provided, and wherein each anti-reflection film:
(a) is substantially optimized or optimized for the corresponding primary color;
(b) is formed on a surface of a color separating and combining prism through which light of said corresponding primary color passes;
(c) is formed of two kinds of materials;
(d) has a layer of high refractive index, a layer of low refractive index and a layer of intermediate refractive index, and said layer of intermediate refractive index is constructed of equivalent film of said layer of high refractive index and said layer of low refractive index; and
(d) has one of the following configurations:
(i) substrate-$\lambda/4$ (intermediate refractivity layer)-$\lambda/4$ (high refractivity layer)-$\lambda/4$ (low refractivity layer)-air;
(ii) substrate-$\lambda/2$ (intermediate refractivity layer)-$\lambda/2$ (high refractivity layer)-$\lambda/4$ t(low refractivity layer)-air; or
(iii) substrate-$3\lambda/4$ (intermediate refractivity layer)-$\lambda/2$ (high refractivity layer)-$\lambda/4$ (low refractivity layer)-air.

2. An apparatus according to claim 1, characterized in that anti-reflection film substantially optimized or optimized for white light is formed on the passing surface of said color separating and combining prism for said white light.

3. An apparatus according to claim 1, characterized in that said reflection type image forming elements are provided with liquid crystal display panels.

4. An apparatus according to claim 3, characterized in that said liquid crystal display panels are panels of a type adjusting the scattered state of light.

5. An apparatus according to claim 3, characterized in that said liquid crystal display panels are panels of a type adjusting the polarized state of light.

6. An apparatus according to claim 1, characterized in that said prism is a cross dichroic prism.

7. An apparatus according to claim 1, characterized in that said prism is a 3P prism.

8. An apparatus according to claim 1, characterized in that said prism is a prism comprising a plurality of cube prisms juxtaposed.

9. An apparatus according to claim 1, characterized in that a field lens is provided between said prism and each of said image forming elements, and anti-reflection film substantially optimized or optimized for the wavelength band of passing light is formed on the light passing surface of each of said field lenses.

10. An apparatus according to claim 1, characterized in that said two kinds of materials are one of zirconium oxide and titanium oxide and one of magnesium fluoride and silicon oxide.

11. An apparatus according to claim 1, characterized in that said colors are red, green, and blue.

12. An apparatus according to claim 1, characterized in that said colors are cyan, magenta and yellow.

13. A projection type display apparatus for superposing a plurality of images of primary colors upon one another to thereby form a colored image, comprising:

a plurality of optical elements each of which includes at least one of:
(a) an element of a color-combining prism passing light of one of said primary colors;
(b) an element of a color-separating prism passing light of one of said primary colors; and
(c) a lens passing light of one of said primary colors; and a plurality of anti-reflection films wherein each of said anti-reflection films:
(a) is formed on one of said plurality of optical elements,
(b) is optimized or substantially optimized for a corresponding primary color,
(c) is formed of two kinds of materials;
(d) has a layer of high refractive index, a layer of low refractive index and a layer of intermediate refractive index, and said layer of intermediate refractive index is constructed of equivalent film of said layer of high refractive index and said layer of low refractive index; and
(e) has one of the following configurations:
(i) substrate-$\lambda/4$ (intermediate refractivity layer)-$\lambda/4$ (high refractivity layer)-$\lambda/4$ (low refractivity layer)-air;
(ii) substrate-$\lambda/2$ (intermediate refractivity layer)-$\lambda/2$ (high refractivity layer)-$\lambda/4$ t(low refractivity layer)-air; or
(iii) substrate-$3\lambda/4$ (intermediate refractivity layer)-$\lambda/2$ (high refractivity layer)-$\lambda/4$ (low refractivity layer)-air.

14. An apparatus according to claim 13, characterized in that said two kinds of materials are one of zirconium oxide and titanium oxide and one of magnesium fluoride and silicon oxide.

15. An apparatus according to claim 13, characterized in that said colors are red, green, and blue.

16. An apparatus according to claim 13, characterized in that said colors are cyan, magenta and yellow.

17. An apparatus according to claim 13, characterized in that said plurality of images are formed by a plurality of transmission type liquid crystal display panels.

18. An apparatus according to claim 13, characterized in that said plurality of images are formed by a plurality of reflection type liquid crystal display panels.

19. An apparatus according to claim 18, characterized in that said color separating prism and said color combining prisms are color separating and combining prisms comprising a common member.

20. An apparatus according to claim 19, characterized in that said liquid crystal display panels are panels of a type adjusting the scattered state of light.

21. An apparatus according to claim 19, characterized in that said liquid crystal display panels are panels of a type adjusting the polarized state of light.

22. An apparatus according to claim 19, characterized in that said prisms are cross dichroic prisms.

23. An apparatus according to claim 19, characterized in that said prisms are 3P prisms.

24. An apparatus according to claim 19, characterized in that said prisms are ones comprising a plurality of cube prisms juxtaposed.

25. An apparatus according to claim 13, characterized in that said at least one corresponds to green.

26. An apparatus according to claim 13, characterized in that said at least one corresponds to red, green and blue.

27. A projection type display apparatus for projecting a plurality of images of primary colors formed by a plurality of image forming elements to thereby form a colored image, comprising:

a light source;

separating means for separating light from said light source into said primary colors of light and for directing said primary colors of light to said image forming elements;

combining means for combining said plurality of images of primary colors; and projecting means for projecting said combined plurality of images of primary colors, characterized in that an anti-reflection film substantially optimized or optimized for a corresponding primary color is formed on each of the surfaces of optical elements of said separating means and said combining means, wherein each of said anti-reflection films:

(a) is formed of two kinds of materials;

(b) has a layer of high refractive index, a layer of low refractive index, and a layer of intermediate refractive index, and said layer of intermediate refractive index is constructed of equivalent film of said layer of high refractive index and said layer of low refractive index; and (c) has one of the following configurations:

(i) substrate-$\lambda/4$ (intermediate refractivity layer)-$\lambda/4$ (high refractivity layer)-$\lambda/4$ (low refractivity layer)-air;

(ii) substrate-$\lambda/2$ (intermediate refractivity layer)-$\lambda/2$ thickness (high refractivity layer)-$\lambda/4$ t(low refractivity layer)-air; or (iii) substrate-$3\lambda/4$ (intermediate refractivity layer)-$\lambda/2$ (high refractivity layer)-$\lambda/4$ (low refractivity layer)-air.

28. An apparatus according to claim 27, characterized in that said separating and directing means and said combining means comprises a common cross dichroic prism and common three lenses.

29. An apparatus according to claim 27, wherein each of said optical elements comprises a prism.

30. An apparatus according to claim 27, wherein each of said optical elements comprises a lens.

* * * * *

UNITED STATES PATENT AND TRADEMARK OFFICE
CERTIFICATE OF CORRECTION

PATENT NO. : 6,040,881
DATED : March 21, 2000
INVENTOR(S) : Koyama

It is certified that error appears in the above-identified patent and that said Letters Patent is hereby corrected as shown below:

<u>Column 1,</u>
Line 39, change "(low refractivity layer) air" to -- (low refractivity layer)-air --.

Signed and Sealed this

Fourteenth Day of May, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.     : 6,040,881
DATED          : March 21, 2000
INVENTOR(S)    : Koyama It is certified that error appears in the above-identified patent and that said Letters Patent is hereby corrected as shown below:

<u>Title page,</u>
Add item -- [73] Canon Kabushiki Kaisha, Tokyo, Japan --.

Signed and Sealed this

Tenth Day of September, 2002

*Attest:*

*Attesting Officer*

JAMES E. ROGAN
*Director of the United States Patent and Trademark Office*